United States Patent [19]

Domnitch

[11] Patent Number: 4,635,569
[45] Date of Patent: Jan. 13, 1987

[54] INCINERATOR SYSTEM ARRANGEMENT WITH DUAL SCRUBBING CHAMBERS

[76] Inventor: Irving Domnitch, 80-15 Forty-First Ave., Elmhurst, N.Y. 11373

[21] Appl. No.: 845,973

[22] Filed: Mar. 28, 1986

[51] Int. Cl.$^4$ ............................................. F23J 15/00
[52] U.S. Cl. .................................. 110/215; 110/119; 110/256; 55/225
[58] Field of Search ............... 110/215, 210, 211, 256, 110/119, 234; 55/225, 227

[56] References Cited

U.S. PATENT DOCUMENTS

| | | | |
|---|---|---|---|
| 2,161,412 | 6/1939 | Gregg et al. | 110/256 |
| 2,678,009 | 5/1954 | Blum et al. | 110/256 |
| 2,895,434 | 7/1959 | Werner | 110/256 |
| 3,485,190 | 12/1969 | Pelletier | 110/256 |
| 3,547,055 | 12/1970 | Zanft | 110/215 |
| 3,548,761 | 12/1970 | Zalman | 110/215 |
| 3,601,069 | 8/1971 | Mancuso | 110/215 |
| 3,710,555 | 1/1973 | Domnitch | 110/215 |
| 3,728,976 | 4/1973 | Domnitch | 110/119 |
| 3,745,939 | 7/1973 | Allbritton | 110/119 |
| 3,839,971 | 10/1974 | Snelling | 110/119 |

Primary Examiner—Henry C. Yuen
Attorney, Agent, or Firm—Ostrolenk, Faber, Gerb & Soffen

[57] ABSTRACT

An incinerator arrangement particularly for a multi-floor building includes a main housing located at the lowest level in the building, and a chute-flue which rises from the main housing to the roof of the building. Waste is burned in a main combustion chamber. Combustion gases are forced to follow a tortuous path through scrubbing chambers located directly above the combustion chamber. In the scrubbing chambers, the combustion gases are first subjected to the flame of after burners and then washed by a fine water spray to reduce ash fly content and particulate matter in the emissions that will be exhausted to the atmosphere. Dual scrubbing systems are included to provide continuous operation and ready maintenance of the system. Location of the scrubbing systems directly above the main combustion chamber avoids freezing and other problems encountered with systems whose scrubbers are located at the roof of the building.

14 Claims, 2 Drawing Figures

INCINERATOR SYSTEM ARRANGEMENT WITH DUAL SCRUBBING CHAMBERS

BACKGROUND OF THE INVENTION

The present invention relates to an incinerator with a scrubbing system for post combustion removal of particulate matter from emissions generated in a primary combustion chamber. More specifically, the present invention relates to a novel arrangement of the elements of the incinerator system in a multi floor building and to such an incinerator which includes dual scrubbing chambers.

A primary concern of the present invention is the reduction of pollution in the air we breath as a result of inefficient incinerators.

Applicant's prior U.S. Pat. Nos. 3,710,555 and 3,772,855 describe incinerators which are fitted with a scrubbing system having very few parts and which operate quite reliably to remove and reduce the fly ash content and other particulate matter in the emission which discharge from the primary combustion chamber. The subject matter of these patents is incorporated herein by reference.

Over the years it was discovered that prior art incinerator systems constructed as taught by applicant's prior patents have the disadvantage that the scrubbing system is located on or near the roof of the building. Consequently, this water based scrubbing system is subject to freezing during the winter and is exposed to other harmful elements. Furthermore, breakdowns, even if they occur infrequently, tend to cause a total shutdown of the system, a condition which is unacceptable both from business and local regulatory considerations. Further, the relatively large distance between the main incinerator chamber and the scrubbing system complicates repair and maintenance.

Another disadvantage of known incinerator systems is the loss of energy produced by the incineration process as the hot emissions escape into the atmosphere.

SUMMARY OF THE INVENTION

Accordingly, it is an object of the present invention to provide an arrangement for an incinerator system in which the scrubbing system is not subject to freezing during winter months.

It is another object of the present invention to provide an incinerator system with dual scrubbing chambers so that the system is capable of continuous operation.

It is another object of the present invention to provide an incinerator system with heat recovery means built into it.

In accordance with the present invention an incinerator system is so arranged that the incinerator is located at the lowest level of a multi floor building and a chute-flue extends from the incinerator to the roof of the building. Occupants of the building drop their waste and garbage into the chute-flue through appropriate doors which are biased to remain in a normally closed position. Emissions from the incinerator chamber rise into the atmosphere through the same chute-flue.

To remove particulate and other undesirable material from the emissions which rise from the main combustion chamber, the emissions are constrained to flow in a tortuous path through a scrubbing system before the emissions enter into the chute-flue. Instead of on the roof, the scrubbing system is located directly above, and preferably is part of, the main housing of the combustion chamber. The scrubbing system includes a water spraying device which emits a fine water spray directed at the emissions. The water spray washes out particulate matter from the emissions and carries the particulate matter away by means of a draining system. The water spray may be automatically controlled to be activated only in the presence of smoke. Before entering the water spray, the emissions comprised of combustion gases and fly ash are further incinerated by the flame of a gas fired after burner located in the scrubbing chamber which burns at a relatively much higher temperature than the flame in the main combustion chamber, to reduce the fly ash content.

In a further improvement of the present invention, a second scrubbing system and a respective after burner therefor are located adjacent the first scrubbing system. Having dual scrubbing systems, the incinerator system is capable of continuous operation. Thus, the failure of one scrubbing system or the periodic maintenance or refurbishment thereof will not result in total incinerator shutdown. Moreover, simultaneous operation of both scrubbing systems is possible, if desired.

The combustion chamber and the scrubbing chambers may be surrounded with water jackets or other energy recovery systems to recover expensive energy that would otherwise be lost to the atmosphere.

Other features and advantages of the present invention will become apparent from the following description of a preferred embodiment of the invention which is described below in relation to the accompanying drawings.

DETAILED DESCRIPTION OF A PREFERRED EMBODIMENT

Figure 1:
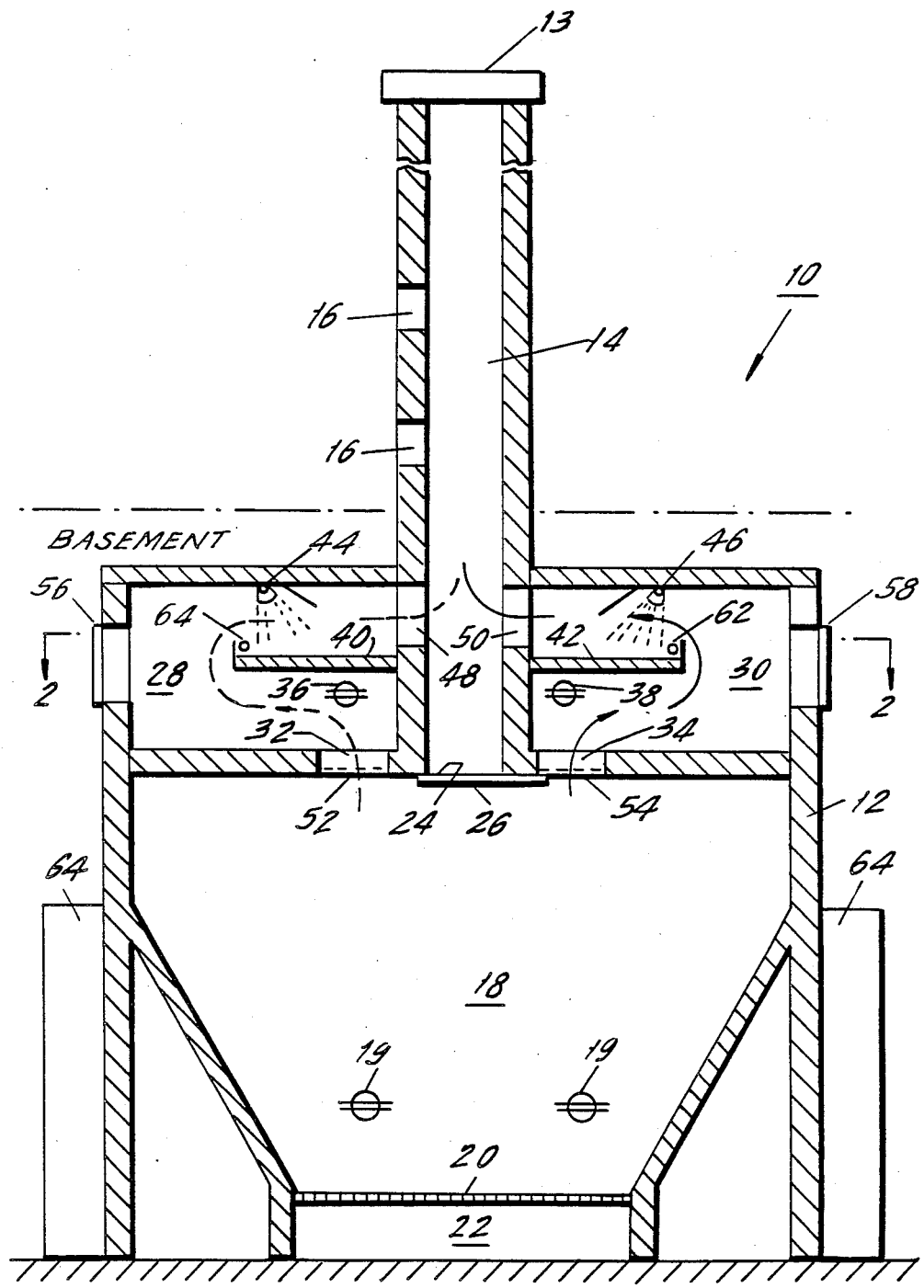
FIG. 1 is an elevational cross-section of the incinerator arrangement of the present invention.

The incinerator system 10 as illustrated in the figures may for example be installed within a multi-floored building such as an apartment house. An incinerator housing 12 is located at the lowest level in the building, for example in the basement, and a chute-flue 14 extends from housing 12, through the floors of the building, and terminates at a chimney opening 13 through which combustion gases enter the atmosphere. Waste disposal openings 16 which are biased to remain normally closed, are located at intermediate floors for waste and garbage disposal therethrough.

Incinerator housing 12 includes a main combustion chamber 18 having a plurality of burners 19 for burning refuse dropped through chute-flue 14 onto grate 20 located in main combustion chamber 18. Burned bulk drops through grate 20 to an ash reservoir 22 located below grate 20. The burned bulk is periodically evacuated through access doors (not shown).

Figure 2:
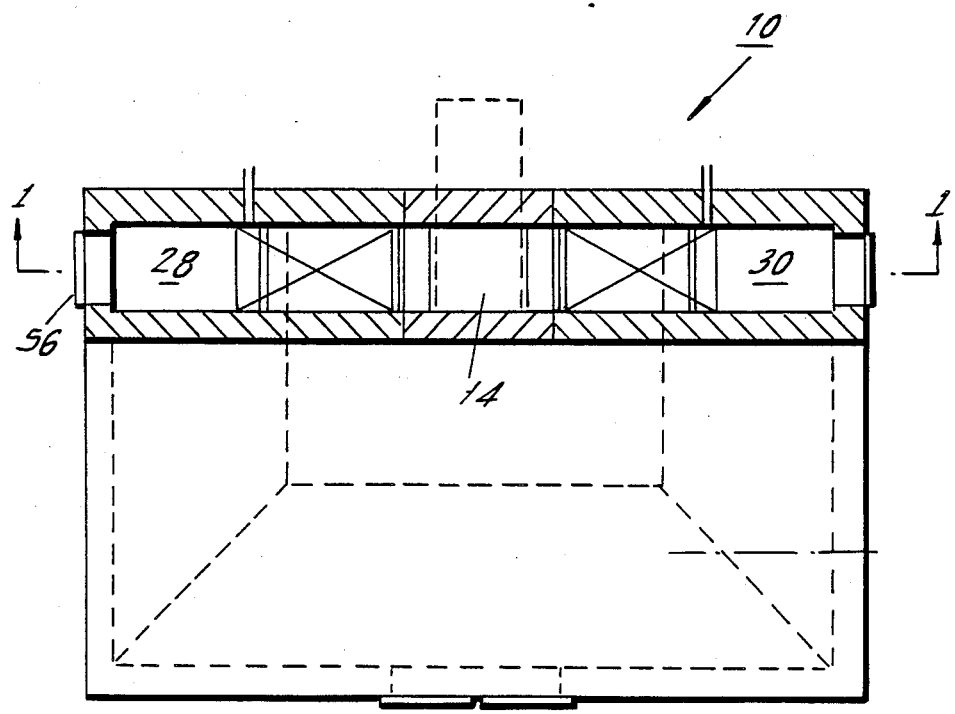
FIG. 2 is a top view in cross-section through the incinerator of FIG. 1 along line 2—2.

Opening 24 between chute-flue 14 and main combustion chamber 18 is normally covered by flue damper 26. The weight of garbage opens flue damper 26, enabling the garbage to drop by gravity into combustion chamber 18. Combustion gases, on the other hand, cannot enter chute-flue 14 directly and are constrained to flow through first and second scrubbing chambers 28 and 30 which flank flue-chute 14. As seen in FIG. 2, scrubbing chambers 28 and 30 project partially over combustion chamber 18. The combustion gases which are blocked by flue damper 26 enter one or the other of the scrubbing chambers through openings 32 or 34.

In the scrubbing chambers, the combustion gases encounter after burners 36 and 38 which burn at a temperature of approximately 1,600 to 1,700 degrees Centigrade or twice as high as the temperature in main combustion chamber 18. Thereby, ash fly content is further burned and reduced.

Drain pan 40 of first scrubbing chamber 28 or drain pan 42 of second scrubbing chamber 30 duplicate as baffles which constrain the emissions to flow directly beneath and past spray boxes 44 and 46 which emit a fine spray of water which washes particulate and other matter from the emissions and deposits the particulate matter onto drain pans 40 and 42 to be carried away and collected at appropriate locations (not shown). After the scrubbing process, the emissions are sufficiently purified to enter chute-flue 14 through openings 48 and 50 to be evacuated to the atmosphere.

Preferably, openings 32 and 34 of scrubbing chambers 28 and 30 are respectively provided with damper plates 52 and 54, as shown in dotted lines. Selective closing of damper plates 52 and 54 provides the opportunity to refurbish or repair one unit while the other is in operation. Moreover, one scrubbing unit may be shutdown during periods of low usage. Access doors 56 and 58 provide access to scrubbing chambers 28 and 30, respectively. Drain pipes 60 and 62 serve for removing pollutants from the scrubbing chambers. Note the sloping front and peripheral sides of combustion chamber 18. The sloped sides serve to direct and place the refuse at an optimum location with respect to burners 19.

A water jacket 64 fitted around main combustion chamber 18 and similar jackets (not shown) surrounding after burners 36 and 38 can be provided to recover a substantial portion of the energy that is generated during the incineration operation.

Although the present invention has been described in relation to a specific embodiment thereof, many other modifications and variations will now become apparent to those skilled in the art. It is preferred, therefore, that the present invention be limited not by the specific disclosure herein, but only by the appended claims.

What is claimed is:

1. An incinerator arrangement, comprising:
   an incinerator housing located near the lowest point in a building, the housing containing incinerator elements therein;
   a chute-flue having a first end in communication with said incinerator housing, a second end at the top of the building for evacuation of combustion gases to the atmosphere therethrough, and at least one intermediately located waste disposal opening through which waste is dropped into said incinerator housing;
   said incinerator elements including:
   a main combustion chamber, an opening between said main combustion chamber and said first end of said chute-flue and a flue-damper covering said opening, said flue-damper biased in a closed position and being operable by the weight of waste to admit said waste into said combustion chamber;
   a scrubbing chamber located exteriorly along the top of said combustion chamber and having a first opening into said combustion chamber and a second opening into said chute-flue; and
   water spraying means in the scrubbing chamber for directing a water spray at said combustion gases to wash particulate matter from said gases before said gases enter said chute-flue whereby said water spraying means which are located adjacent said combustion chamber are protected against freezing and the elements.

2. The incinerator arrangement of claim 1 wherein said building is a multi floor building.

3. The incinerator arrangement of claim 2 further comprising an after burner located in said scrubbing chamber ahead of said water spraying means for further burning and for reducing ash fly content of said combustion gases.

4. The incinerator arrangement of claim 3 wherein a flame temperature of said after burner is at least about twice as hot as a flame temperature in said combustion chamber.

5. The incinerator arrangement of claim 3 further comprising a baffle located between said water spraying means and said after burner, said baffle being oriented to cause substantially all of said combustion gases to flow through said water spray, said baffle including means for collecting said water spray and said particulate matter for removal thereof from said incinerator.

6. The incinerator arrangement of claim 5 in which the combustion chamber comprises interior sloping sides which are oriented to channel waste onto a grate located in said combustion chamber.

7. The incinerator arrangement of claim 3 further comprising energy recovery means for recovering energy generated during combustion.

8. An incinerator arrangement comprising:
   an incinerator housing located near the lowest point in a building, the housing containing incinerator elements therein;
   a chute-flue having a first end in communication with said incinerator housing, a second end at the top of the building for evacuation of combustion gases to the atmosphere therethrough, and at least one intermediately located waste disposal opening through which waste is dropped into said incinerator housing;
   said incinerator elements including:
   a main combustion chamber, an opening between said main combustion chamber and said first end of said chute-flue and a flue-damper covering said opening, said flue-damper biased in a closed position and being operable by the weight of waste to admit said waste into said combustion chamber;
   a first scrubbing chamber located exteriorly along the top of said combustion chamber and having a first opening into said combustion chamber and a second opening into said chute-flue;
   a second scrubbing chamber located exteriorly along the top of said combustion chamber and having a first opening into said combustion chamber and a second opening into said chute-flue;
   water spraying means in the scrubbing chambers for directing a water spray at said combustion gases to wash particulate matter from said gases before said gases enter said chute-flue whereby said water spraying means which are located adjacent said combustion chamber are protected against freezing and the elements.

9. The incinerator arrangement of claim 8 wherein said building is a multi floor building.

10. The incinerator arrangement of claim 9 further comprising a respective after burner located in each of said scrubbing chambers ahead of said water spraying means for further burning and for reducing ash fly content of said combustion gases.

11. The incinerator arrangement of claim 10 wherein a flame temperature of said respective burner is about twice as hot as a flame temperature in said combustion chamber.

12. The incinerator arrangement of claim 10 further comprising a respective baffle located between said water spraying means and said after burner of each said scrubbing chamber, said respective baffle being oriented to cause substantially all of said combustion gases to flow through said water spray, said baffle including means for collecting said water spray and said particulate matter for removal thereof from said incinerator.

13. The incinerator arrangement of claim 12 in which said combustion chamber comprises interior sloping sides which are oriented to channel waste onto a grate located in said combustion chamber.

14. The incinerator arrangement of claim 10 further comprising energy recovery means for recovering energy generated during combustion.

* * * * *